(12) United States Patent
Yoo et al.

(10) Patent No.: US 8,872,938 B2
(45) Date of Patent: Oct. 28, 2014

(54) SENSE AMPLIFIER INCLUDING NEGATIVE CAPACITANCE CIRCUIT AND APPARATUSES INCLUDING SAME

(75) Inventors: Kwi Sung Yoo, Seoul (KR); Min Ho Kwon, Seoul (KR); Wun-Ki Jung, Suwon-si (KR); Jin Ho Seo, Seoul (KR); Dong Hun Lee, Yongin-si (KR); Won Ho Choi, Suwon-si (KR); Jae Hong Kim, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 457 days.

(21) Appl. No.: 13/345,949

(22) Filed: Jan. 9, 2012

(65) Prior Publication Data

US 2012/0176523 A1    Jul. 12, 2012

(30) Foreign Application Priority Data

Jan. 10, 2011    (KR) ........................ 10-2011-0002308

(51) Int. Cl.
| | | |
|---|---|---|
| H04N 9/64 | (2006.01) | |
| H04N 5/378 | (2011.01) | |
| H04N 5/3745 | (2011.01) | |
| H04N 3/14 | (2006.01) | |

(52) U.S. Cl.
CPC ............. *H04N 5/378* (2013.01); *H04N 5/3745* (2013.01)

USPC .................. 348/230.1; 348/320; 348/E5.091; 250/208.1; 327/52

(58) Field of Classification Search
USPC .............. 348/230.1, 231.9, 320, 322, E5.091, 348/E3.017, E3.022, FOR. 207
See application file for complete search history.

(56) References Cited

U.S. PATENT DOCUMENTS

| | | | | |
|---|---|---|---|---|
| 6,437,612 | B1 * | 8/2002 | Dasgupta et al. | 327/108 |
| 7,049,756 | B2 * | 5/2006 | Aiba et al. | 315/172 |
| 7,113,437 | B2 * | 9/2006 | Schweickert et al. | 365/145 |
| 2007/0139242 | A1 * | 6/2007 | Krymski | 341/155 |
| 2007/0205970 | A1 * | 9/2007 | Tang et al. | 345/87 |
| 2009/0262229 | A1 | 10/2009 | Lim et al. | |

FOREIGN PATENT DOCUMENTS

| | | |
|---|---|---|
| JP | 2004-080690 | 3/2004 |
| JP | 2006-080937 | 3/2006 |
| JP | 2008-048405 | 2/2008 |
| KR | 1020090111029 A | 10/2009 |

* cited by examiner

*Primary Examiner* — Hung Lam
(74) *Attorney, Agent, or Firm* — Volentine & Whitt, PLLC

(57) ABSTRACT

A sense amplifier having a negative capacitance circuit receives differential input signals via a pair of data lines, and senses and amplifies a voltage difference between differential output signals corresponding to the differential input signals as loaded by the negative capacitance circuit using a differential-to-single-ended amplifier to generate a corresponding data output signal.

19 Claims, 8 Drawing Sheets

US 8,872,938 B2

SENSE AMPLIFIER INCLUDING NEGATIVE CAPACITANCE CIRCUIT AND APPARATUSES INCLUDING SAME

CROSS-REFERENCE TO RELATED APPLICATIONS

This application claims priority under 35 U.S.C. §119(a) from Korean Patent Application No. 10-2011-0002308 filed on Jan. 10, 2011, the subject matter of which is hereby incorporated by reference.

BACKGROUND OF THE INVENTION

The inventive concept relates to semiconductor devices and more particularly to Complementary Metal Oxide Semiconductor (CMOS) image sensors. Certain embodiments of the inventive concept relate to sense amplifiers including a negative capacitance circuit. Such sense amplifiers may be used within CMOS image sensors and related apparatuses to better facilitate the high speed output of data at reduced bit error rates.

Conventional CMOS image sensors usually couple a multiplicity of data storage elements (e.g., 1-bit Static Random Access Memory (SRAM) elements) to one or more data channels connecting a sense amplifier. Each channel may include relatively long signal line(s) that connect respectively selected data storage elements to the sense amplifier. The number of connected data storage elements, the bandwidth of the channel and the length of the constituent signal line(s) will affect the speed with which data may be coherently communicate to the sense amplifier. Accordingly, attempts to increase the rate at which data is output through a CMOS sense amplifier must address such interrelated factors as channel width and signal transmission characteristics and limitations in view of an acceptable bit error rate, etc. And all these factors must be weighed against the permissible size and power consumption characteristics of the CMOS image sensor and constituent component parts.

SUMMARY OF THE INVENTION

According to certain embodiments of the inventive concept, there is provided a sense amplifier comprising; a negative capacitance circuit connected between the pair of data lines communicating differential input signals, a current bias circuit that provides a bias current to the negative capacitance circuit, a voltage bias circuit that provide a bias voltage to the pair of data lines, and a comparator that receives differential output signals corresponding to the differential input signals as loaded by the negative capacitance circuit and generates a corresponding data output signal.

According to certain embodiments of the inventive concept, there is provided an image sensor comprising; a pixel providing a pixel signal, an analog-to-digital conversion (ADC) circuit that converts the pixel signal to differential input signals, and a pair of data lines communicating the differential input signals. A sense amplifier senses and amplifies a voltage difference between the differential input signals, and comprises, a negative capacitance circuit connected between the pair of data lines, a current bias circuit that provides a bias current to the negative capacitance circuit, a voltage bias circuit that provide a bias voltage to the pair of data lines, and a comparator that receives differential output signals corresponding to the differential input signals as loaded by the negative capacitance circuit and generates a corresponding data output signal.

According to certain embodiments of the inventive concept, there is provided an image processing apparatus comprising; a lens, an image sensor configured to convert an optical signal received via the lens into corresponding electrical image data, and a processor that controls operation of the image sensor. The image sensor comprises; a pixel that provides a pixel signal, an analog-to-digital (ADC) conversion circuit that converts the pixel signal into differential input signals, and a sense amplifier that senses and amplifies a voltage difference between the differential input signals as communicated to the sense amplifier by a pair of data lines. The sense amplifier comprises; a negative capacitance circuit connected between the pair of data lines, a current bias circuit that provides a bias current to the negative capacitance circuit, a voltage bias circuit that provides a bias voltage to the pair of data lines, and a comparator that receives differential output signals corresponding to the differential input signals as loaded by the negative capacitance circuit and generates a corresponding data output signal.

According to certain embodiments of the inventive concept, there is provided a method of operating a sense amplifier, the method comprising; receiving differential input signals via a pair of data lines in a negative capacitance circuit, and amplifying a voltage difference between differential output signals corresponding to the differential input signals as loaded by the negative capacitance circuit using a differential-to-single-ended amplifier to generate a corresponding data output signal.

BRIEF DESCRIPTION OF THE DRAWINGS

The above and other features and advantages of the present inventive concept will become more apparent upon consideration of certain embodiments with reference to the accompanying drawings in which.

DETAILED DESCRIPTION

Figure 1:
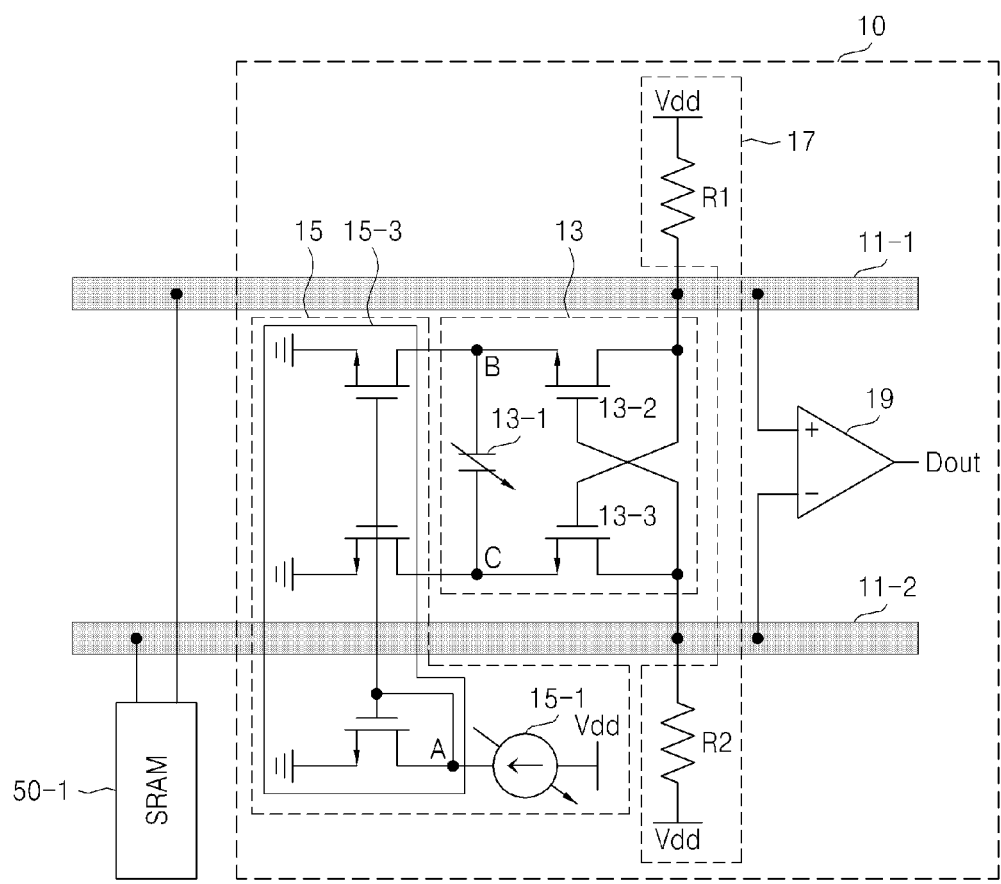
FIG. 1 is a circuit diagram of a sense amplifier according to an embodiment of the inventive concept.

Certain embodiments of the inventive concept will now be described in some additional detail with reference to the accompanying drawings. The inventive concept may, however, be embodied in many different forms and should not be construed as being limited to only the illustrated embodiments. Rather, the illustrated embodiments are provided so that this disclosure will be thorough and complete. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure (FIG.) 1 is a circuit diagram of a sense amplifier 10 according to an embodiment the inventive concept. For purposes of this description, it is assumed that a SRAM element 50-1 is operatively associated with the sense amplifier 10. However, those skilled in the art will recognize that other input sources of data (e.g., register, latch, or memory elements) might alternately be associated with the sense amplifier 10.

Referring to FIG. 1, the sense amplifier 10 comprises a pair of data lines 11-1 and 11-2 that communicate differential signals. That is, through the pair of data lines 11-1 and 11-2 differential input data signals are received from the SRAM 50-1 and corresponding differential output data signals are applied to an output comparator 19. A negative capacitance circuit 13 is connected between the pair of data lines 11-1 and 11-2. A current bias circuit 15 provides a bias current to the negative capacitance circuit 13 and a voltage bias circuit 17 provides a bias voltage to the data lines 11-1 and 11-2. The comparator 19 amplifies a difference between differential output signals apparent on the through the pair of data lines 11-1 and 11-2 after loading of the pair of data lines 11-1 and 11-2 by the negative capacitance circuit 13. In this regard, the term "loading" should be broadly construed to mean any change in current and/or voltage level, as well as change in timing, caused by the negative capacitance circuit 13 on the differential input data signals, as compared with the corresponding differential output signals.

Those skilled in the art will recognize that the pair of data lines 11-1 and 11-2 in the embodiment illustrated in FIG. 1 function as a 1-bit data bus (or signal line) to communicate a single bit of data provided by the SRAM 50-1 to the sense amplifier 10.

The loading effect (e.g., a total capacitance) provided by the negative capacitance circuit 13 may be controlled (or set) according to certain externally provided "control codes". Each control code may include a single bit or multiple bits of control data. Those skilled in the art will recognize that the negative capacitance circuit 13 may be variously embodied according to the overall design and operating parameters of the sense amplifier 10. For example, a negative impedance circuit or negative conductance circuit may be used. In the specific example illustrated in FIG. 1, the negative capacitance circuit 13 includes a capacitor bank 13-1 and a pair of (first and second) cross-connected transistors 13-2 and 13-3.

Figure 2:
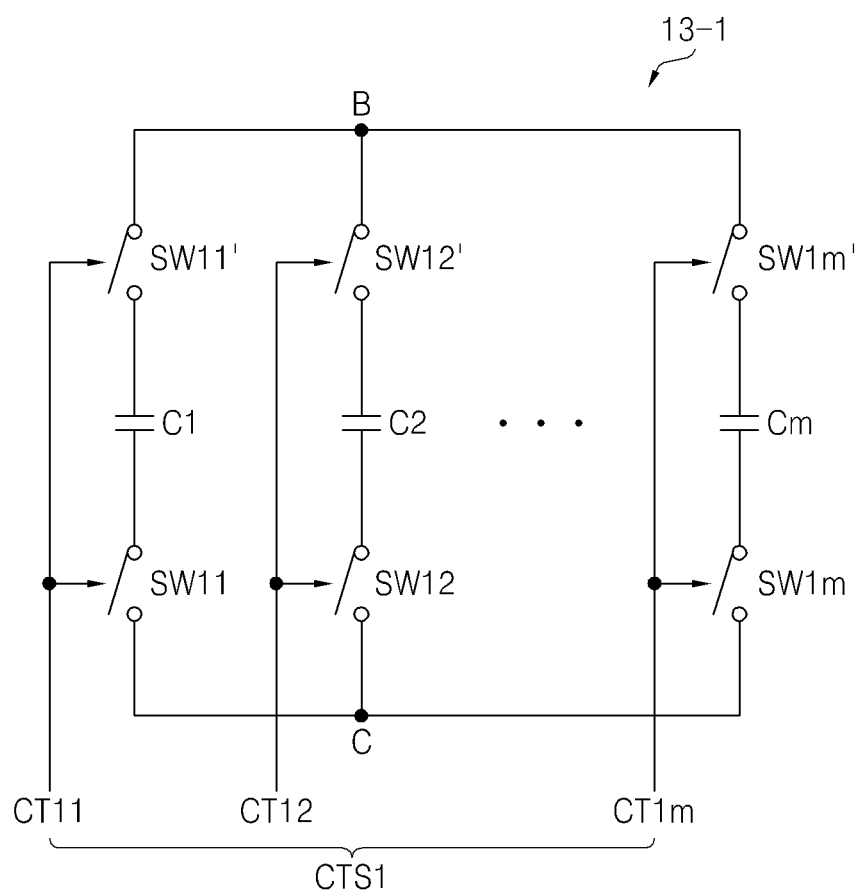
FIG. 2 is a circuit diagram further illustrating the capacitor bank of FIG. 1 according to an embodiment the inventive concept.

FIG. 2 is a partial circuit diagram, illustrating in relevant part, one possible implementation example for the capacitor bank 13-1 of FIG. 1 according to an embodiment of the inventive concept. Referring to FIG. 2, the capacitor bank 13-1 comprises a plurality of capacitors C1 through Cm selectively switched in and out of a parallel array of capacitors by corresponding sets a capacitor switches SW11 through SW1$m$ and SW11' through SW1$m$', where "m" is a natural number.

For instance, when a first set of the capacitor switches SW11 and SW11' is turned ON in response to a first switching control bit CT11 of an applied first control code CTS1, a first capacitor C1 is switched into the capacitor bank 13-1 (conceptually illustrated as being apparent between two conductive nodes B and C). When a m-th (last) set of capacitor switches SW1$m$ and SW1$m$' is turned ON in response to an m-th switching control bit CT1$m$ of the first control code CTS1, an m-th capacitor Cm is switched into the capacitor bank 13-1. Accordingly, a total (or cumulative) capacitance of the capacitor bank 13-1 may be selectively controlled (or set) according to the first control code CTS1.

For example, where each set of capacitor switches SW11 through SW1$m$ and SW11' through SW1$m$' is implemented using an N-type metal-oxide semiconductor (NMOS) transistor, each of the capacitor switches SW11 through SW1$m$ and SW11' through SW1$m$' may be turned ON by a corresponding switching control bit having a first level (e.g., a logically "high" or a data value of "1").

Returning to FIG. 1, the first cross-connected transistor 13-2 connects node B (i.e., one side of the capacitor bank 13-1) to a first one 11-1 of the pair of data lines. The gate of the first cross-connected transistor 13-2 is connected to node C (i.e., the other or opposing side of the capacitor bank 13-1). In contrast, the second cross-connected transistor 13-3 connects node C (i.e., the other side of the capacitor bank 13-1) to a second one 11-2 of the pair of data lines, and the gate of the second cross-connected transistor 13-3 is connected to node B (i.e., the one side of the capacitor bank 13-1).

Those skilled in the art will also recognize that the current bias circuit 15 may be variously embodied. In the specific illustrated embodiment of FIG. 1, the current bias circuit 15 includes a current source 15-1 that provides a reference current to a current mirror 15-3 that provides a desired bias current by mirroring the reference current provided by the current source 15-1.

Figure 3:
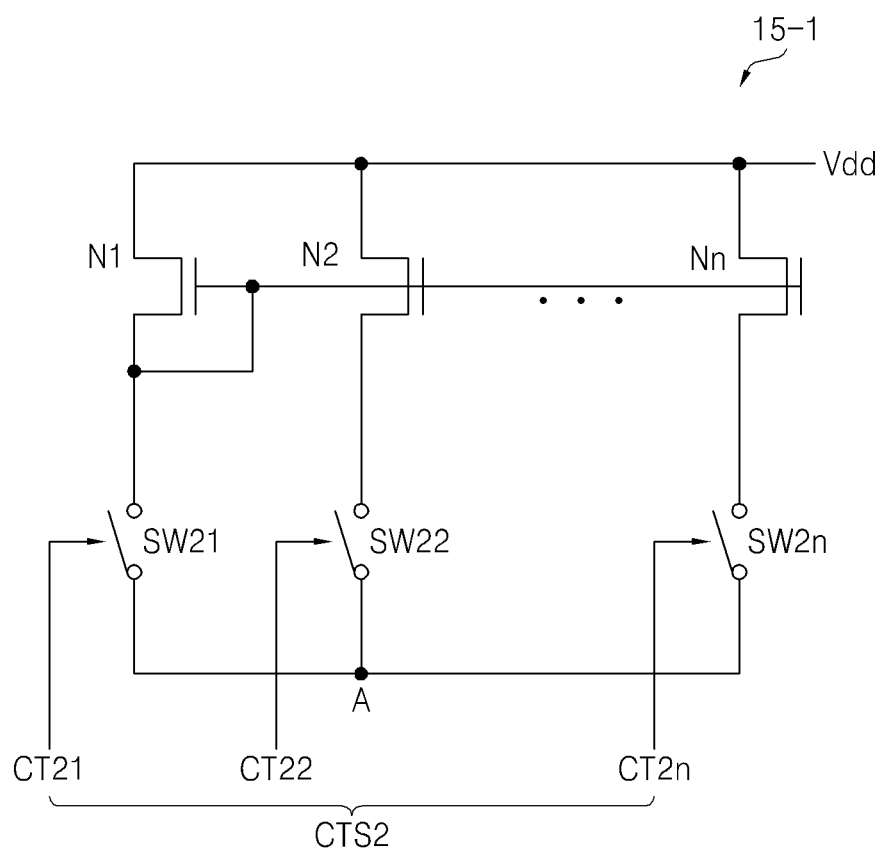
FIG. 3 is a circuit diagram further illustrating the current source of FIG. 1 according to an embodiment the inventive concept.

FIG. 3 is a partial circuit diagram, illustrating in relevant part, one possible implementation example for the current source 15-1 of FIG. 1 according to an embodiment of the inventive concept. Referring to FIG. 3, the current source 15-1 may include a plurality of current transistors N1 through Nn and a corresponding plurality of current switches SW21 through SW2n, where "n" is a natural number. The level of the ultimately generated reference current provided by the current source 15-1 may be controlled (or set) according to a second, externally provided control code CTS2.

For example, when the current switches SW21 through SW2n are selectively and respectively turned ON in response to bits CT21 through CT2n of the second control code CTS2, the current transistors N1 through Nn are respectively switched into a resulting bank of current transistor between a power supply voltage (e.g., Vdd) and a control node A.

The resulting level (or amount) of the reference current flowing through the "switched-in" current transistors N1 through Nn may be adjusted by selectively differentiating the channel width-to-length ratios of the respective current transistors N1 through Nn. Accordingly, the reference current generated by the current source 15-1 may be controlled (or set) according to the second control code CTS2.

The first control code CTS1 and the second control code CTS2 may be set, for example, during a test procedure measuring and/or defining the data read performance of the sense amplifier 10, during a test procedure measuring and/or defining the data read performance of a semiconductor apparatus (e.g., an image sensor illustrated in FIG. 4 or an image processing apparatus illustrated in FIG. 6) including the sense amplifier 10.

Returning again to FIG. 1, the voltage bias circuit 17 includes a first resistor R1 connected between the power supply voltage Vdd and the first data line 11-1 and a second resistor R2 connected between the power supply voltage Vdd and the second data line 11-2. The resistance value of the first resistor R1 may be the same as or different from the resistance value of the second resistor R2.

The comparator 19 may be implemented, for example, using a differential-to-single-ended amplifier. Therefore, the comparator 19 may amplify a voltage difference between the differential output signals as loaded by the negative capacitance circuit 13 in order to output a single-ended output signal (Dout).

Figure 4:
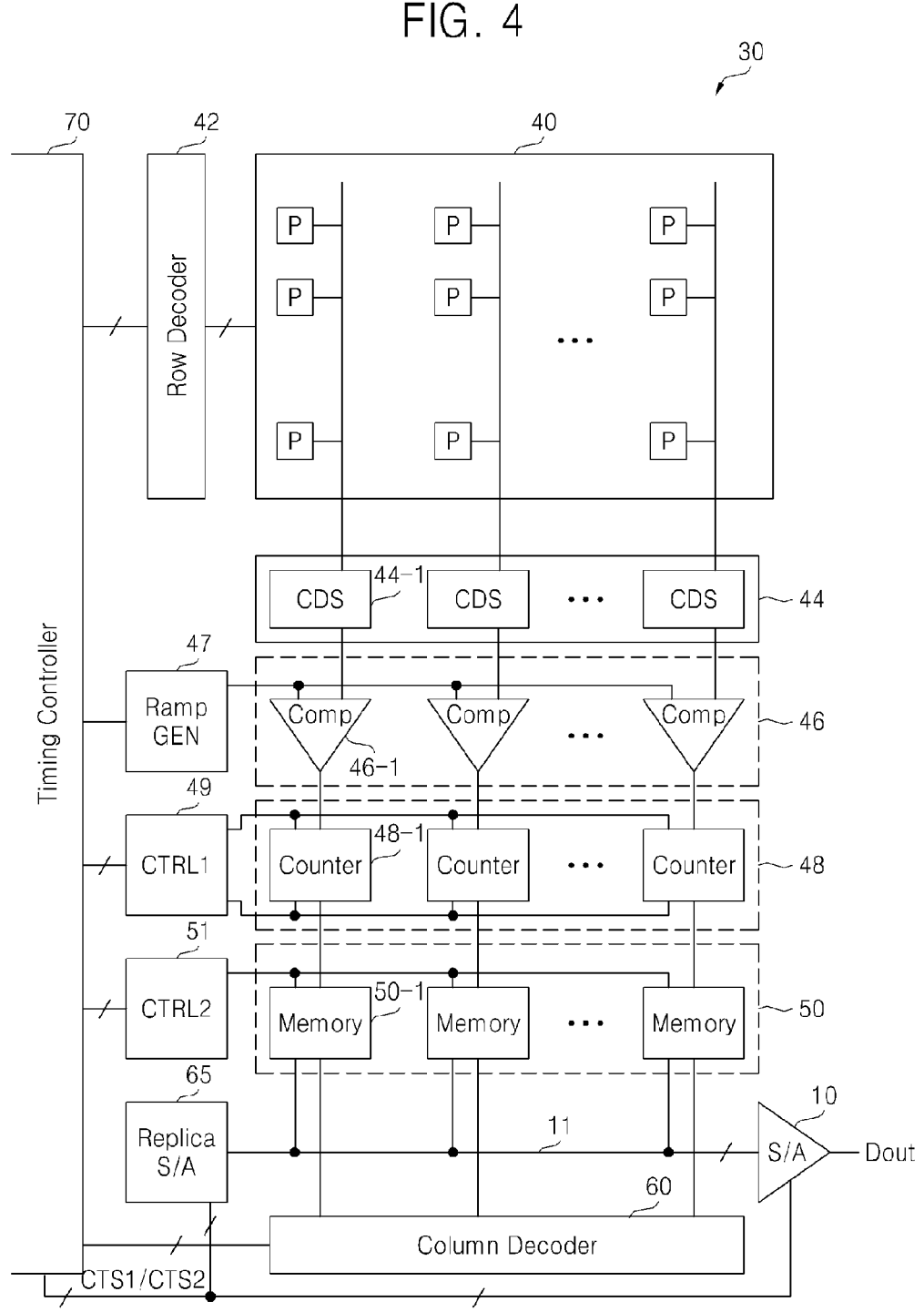
FIG. 4 is a block diagram of an image sensor incorporating the sense amplifier illustrated of FIG. 1.

FIG. 4 is a block diagram of an image sensor 30 including the sense amplifier 10 of FIG. 1. Referring to FIG. 4, the image sensor 30 is assumed to be a CMOS image sensor comprising; an active pixel sensor array 40, a row decoder 42, a correlated double sampling (CDS) block 44, a comparator block 46, a ramp generator 47, a column counter block 48, a counter controller 49, a memory block 50, a memory controller 51, a column decoder 60, the sense amplifier 10, a replica sense amplifier 65, and a timing controller 70.

The CDS block 44, the comparator block 46, the column counter block 48, and the memory block 50 may function as an analog-to-digital conversion (ADC) circuit.

The active pixel sensor array 40 includes a plurality of pixels P. Each pixel P may be implemented by a photo sensitive element that generates a pixel signal from an incident optical signal. The pixel signal may defined in accordance with a reset signal and an imager signal, for example.

The row decoder 42 may be used to generate a plurality of control signals that selectively actuate the photo sensing operation of each pixel P under the control of the timing controller 70. In certain embodiments, the row decoder 42 may be used to drive pixel on a row by row basis.

The CDS block 44 includes a columnar arrangement of CDS circuits 44-1. Each CDS circuit 44-1 is respectively connected to a corresponding column and performs a CDS operation on a pixel signal provided the column in order to output a CDS pixel signal.

The comparator block 46 includes a plurality of comparators 46-1. Each comparator 46-1 compares a ramp signal output from the ramp generator 47 with a CDS pixel signal from a CDS circuit 44-1 in order to output a comparison signal.

The column counter block 48 includes a plurality of column counters 48-1. Each column counters 48-1 determines (or "counts") respective durations between transitions of the comparison signal in response to a clock signal under the control of the counter controller 49 in order to output a count value.

The memory block 50 includes a plurality of memories 50-1 operating under the control of the memory controller 51 and/or the timing generator 70. Each memory 50-1 stores a count value provided by a column counter 48-1 under the control of the memory controller 51. In certain embodiments, each memory 50-1 may be implemented using an SRAM, as assumed in the embodiment illustrated in FIG. 1.

The column decoder 60 generates a selection signal that selects each memory 50-1 under the control of the timing controller 70. For instance, when the column decoder 60 outputs a selection signal activated to select a first memory 50-1, data stored in the first memory 50-1 is communicated to the sense amplifier 10 via a pair of data lines 11. The column decoder 60 may thus sequentially activate each selection signal so that data stored in each memory 50-1 is sequentially output to a corresponding pair of data lines 11.

The sense amplifier 10 including the negative capacitance circuit 13 may then be used to sense and amplify a difference between the resulting differential output signals received through the data lines 11-1 and 11-2 and outputs the amplified data Dout. Since the sense amplifier 10 according to an embodiment of the inventive concept is connected between the pair of data lines 11, the replica sense amplifier 65 is also provided to match impedances for the channels(s) (i.e., the constituent differential signals lines) connected to the sense amplifier 10.

Figure 5:
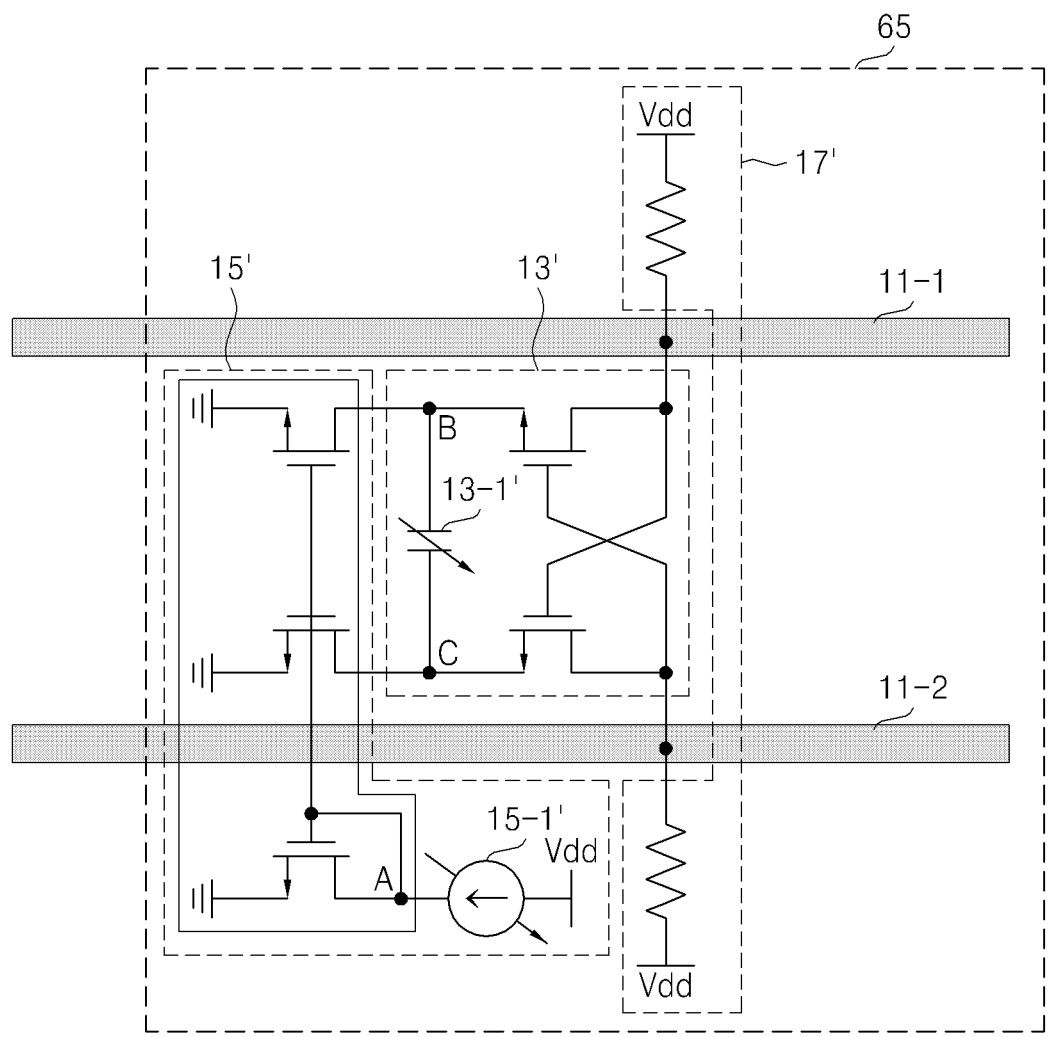
FIG. 5 is a circuit diagram further illustrating the replica sense amplifier of FIG. 4.

FIG. 5 is a circuit diagram of one possible implementation of the replica sense amplifier 65 of FIG. 4. Unlike the sense amplifier 10 illustrated in FIG. 1, the replica sense amplifier 65 does not include a comparator.

Referring to FIGS. 1 and 5, the replica sense amplifier 65 may include a second negative capacitance circuit 13' having the same configuration as the negative capacitance circuit 13, a second current bias circuit 15' having the same configuration as the current bias circuit 15, and a voltage bias circuit 17' having the same configuration as the voltage bias circuit 17.

The total capacitance of the capacitor bank 13-1 in the sense amplifier 10 and the total capacitance of a capacitor bank 13-1' in the replica sense amplifier 65 may be controlled (or set) according to the first control code CTS1 provided, for example, through the timing controller 70. A reference current generated by the current source 15-1 in the sense amplifier 10 and a reference current generated by a current source 15-1' in the replica sense amplifier 65 may be controlled (or set) according to the second control code CTS2 also provided, for example, by the timing controller 70.

As will be conventionally appreciated, the timing controller 70 may be used to provide control signal(s) controlling the operation (and inter-operation) of each of the sense amplifier 10, row decoder 42, ramp generator 47, counter controller 49, memory controller 51, and replica sense amplifier 65.

Figure 6:
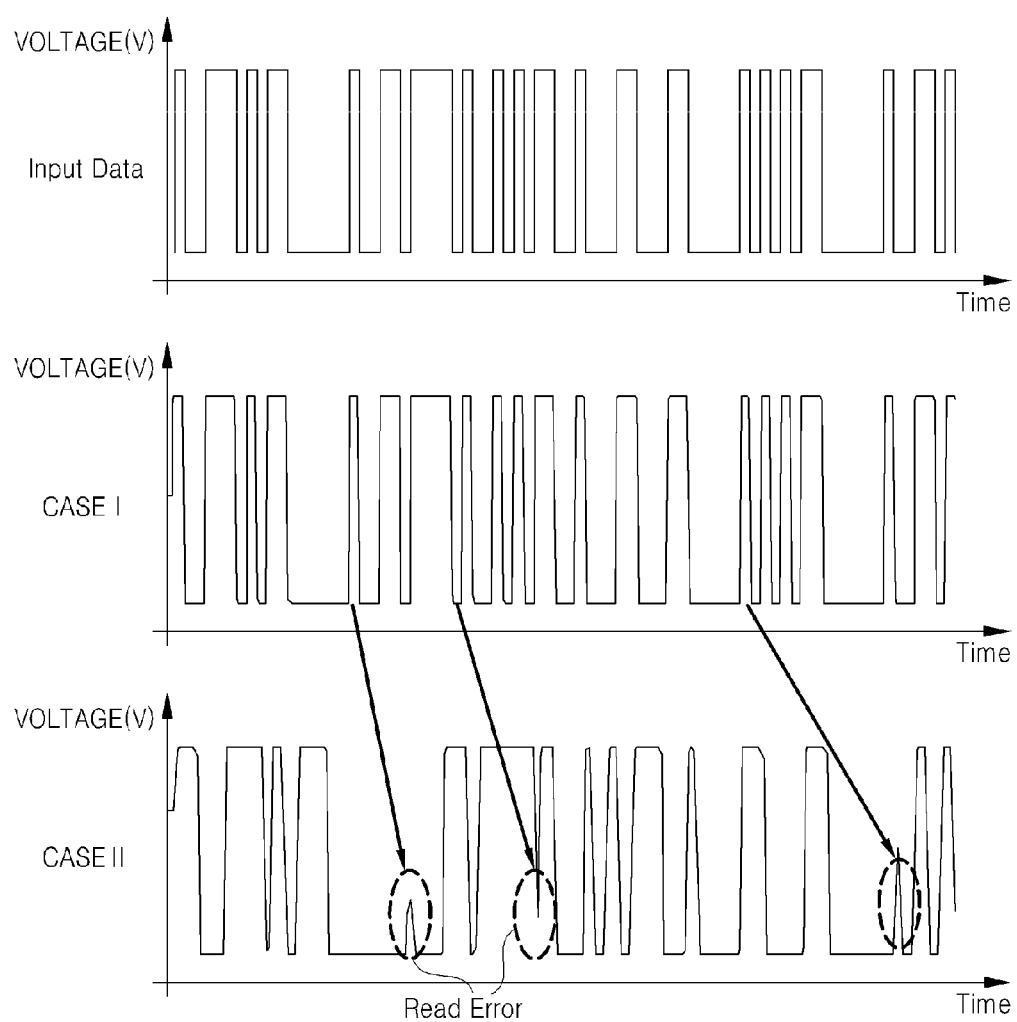
FIG. 6 is a collection of waveform diagram illustrating relationships between input and output signals apparent in the sense amplifier of FIG. 1, as well as comparative input/output signals for a sense amplifier without the negative capacitance circuit included within embodiments of the inventive concept.

FIG. 6 is a collection of waveforms illustrating certain relationships between input and output signals for the sense amplifier 10 of FIG. 1 (Case I) and similar relationships between input and output signals for a sense amplifier that does not include a negative capacitance circuit (Case II).

Referring collectively to FIGS. 1, 4, and 6, when input data is communicated via the pair of the lines 11-1 and 11-2 at an input data rate of (e.g.,) 100 Mbps, an exemplary sense amplifier according to an embodiment of the inventive concept including the negative capacitance circuit 13 will yield corresponding output data without errors as shown in Case I.

However, a conventional sense amplifier that does not include the negative capacitance circuit 13 may not correctly sense and amplify a stream of input data that includes a data value of "1" that follows multiple, sequential data values of "0", or a data value of "0" that follows multiple, sequential data values of "1". Possible errant results are shown in Case 11 of FIG. 6 for a input data rate of only 80 Mbps.

Accordingly, the sense amplifier 10 including the negative capacitance circuit 13 increases the maximum rate at which read data may be obtained for a given number of channels, even when a frame rate is restricted by the bandwidth of a constituent pair of data lines 11-1 and 11-2. In other words, the sense amplifier 10 according to an embodiment of the inventive concept may operate at a high frequency than conventional sense amplifiers having similar channel and data storage element related transmission constraints.

Figure 7:
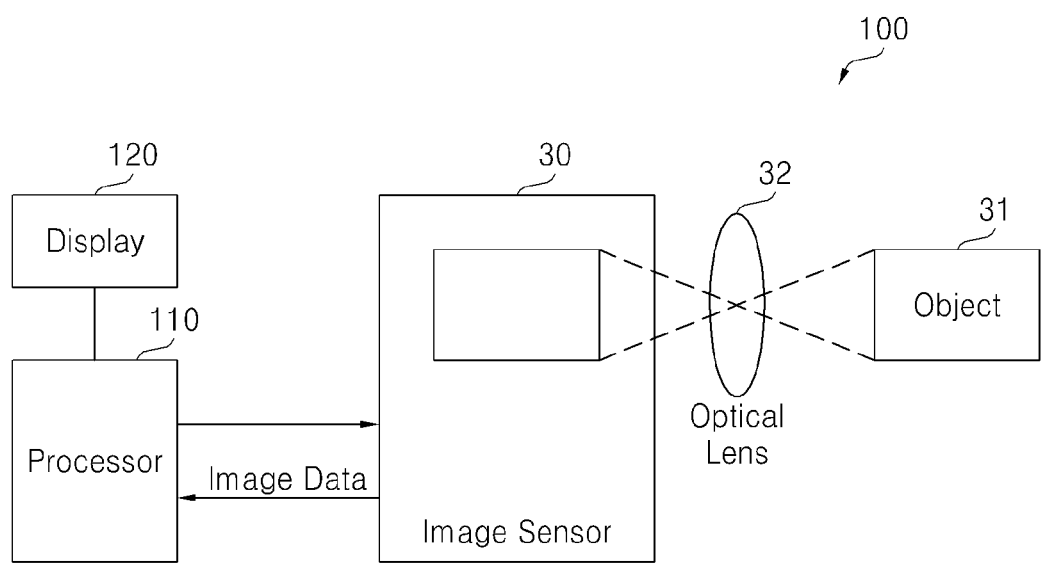
FIG. 7 is a block diagram of an image processing apparatus incorporating the image sensor illustrated of FIG. 4.

FIG. 7 is a block diagram of an image processing apparatus 100 including the image sensor 30 of FIG. 4. Referring to FIG. 7, the image processing apparatus 100 comprises; the image sensor 30, an optical lens 32, a processor 110, and a display 120. The image processing apparatus 100 may be a digital camera or a data processing apparatus including the digital camera, such as a personal computer (PC), a cellular phone, a smart phone, a tablet PC, or an information technology (IT) apparatus. The digital camera may be a digital single-lens reflex (DSLR) camera.

The image sensor 30 converts an optical image signal of an object 31, which is received through the optical lens 32, into electrical image data. The processor 110 controls the operation of the image sensor 30, processes the image data output from the image sensor 30, and transmits the processed image data to the display 120 so that the processed image data is displayed. The image data may be generated in accordance with an output data signal (Dout) provided from a sense amplifier like the one described above.

Figure 8:
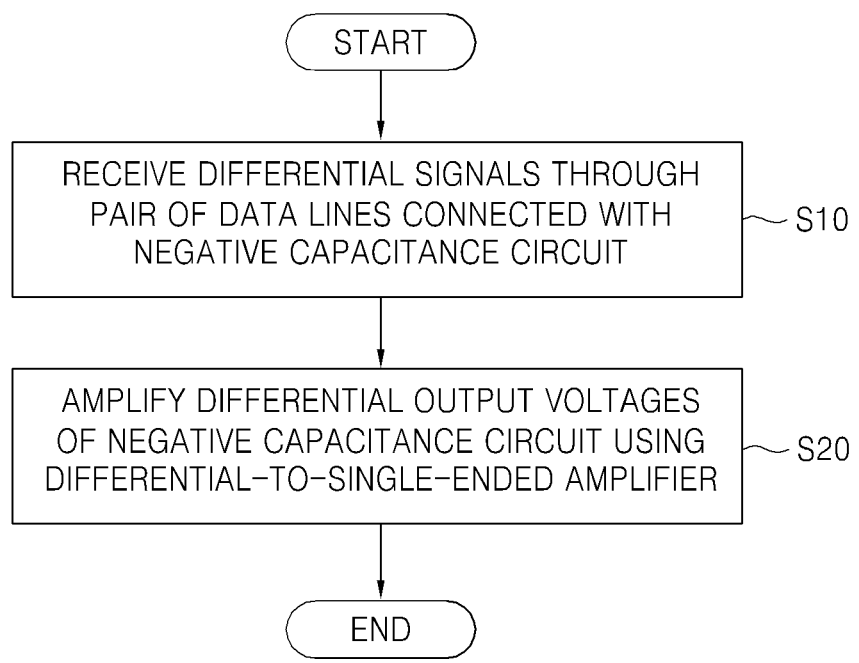
FIG. 8 is a flowchart summarizing one possible method of operation for the sense amplifier of FIG. 1.

FIG. 8 is a flowchart generally summarizing one possible method of operating the sense amplifier 10 of in FIG. 1. Referring to FIGS. 1 and 8, the sense amplifier 10 receives differential input data signals via the pair of the data lines 11-1 and 11-2 connected with the negative capacitance circuit 13 (S10). The comparator 19, e.g., a differential-to-single-ended amplifier, connected between the pair of data lines 11-1 and 11-2 amplifies corresponding differential output signals provided as the result of loading by the negative capacitance circuit 13 and outputs the data output signal (Dout) (S20). The voltage bias circuit 17 provides a bias voltage to the pair of data lines 11-1 and 11-2 and the current bias circuit 15 provides a bias current to the negative capacitance circuit 13.

As described above, according to certain embodiments of the inventive concept, a sense amplifier including a negative capacitance circuit is capable of correctly sensing and amplifying input data at relatively higher speeds. Consequently, the read data obtained by apparatuses incorporating the sense amplifier may be increased.

While the present inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A sense amplifier comprising:
    a negative capacitance circuit connected between a pair of data lines communicating differential input signals;
    a current bias circuit that provides a bias current to the negative capacitance circuit;
    a voltage bias circuit that provide a bias voltage to the pair of data lines; and
    a comparator that receives differential output signals corresponding to the differential input signals as loaded by the negative capacitance circuit and generates a corresponding data output signal.

2. The sense amplifier of claim 1, wherein the comparator is a differential-to-single-ended amplifier.

3. The sense amplifier of claim 1, wherein at least one of a capacitance of the negative capacitance circuit and a level of the bias current is determined by at least one externally provided control codes.

4. The sense amplifier of claim 3, wherein the negative capacitance circuit comprises:
    a capacitor bank including a plurality of capacitances selectively switched in/out of the capacitor bank in response to one of the at least one externally provided control codes; and
    a pair of cross-connected transistors connected between the capacitor bank and the pair of data lines.

5. The sense amplifier of claim 3, wherein the current bias circuit comprises:
    a current source that generates a reference current determined in accordance with one of the at least one externally provided control codes; and
    a current mirror that provides the bias current by mirroring the reference current.

6. The sense amplifier of claim 3, wherein the at least one externally provided control codes comprises a first control code and a second control code,
    the negative capacitance circuit comprises; a capacitor bank including a plurality of capacitances selectively switched in/out of the capacitor bank in response to the first control code, and a pair of cross-connected transistors connected between the capacitor bank and the pair of data lines, and
    the current bias circuit comprises; a current source that generates a reference current determined in accordance with the second control code, and a current mirror that provides the bias current by mirroring the reference current.

7. An image sensor comprising:
    a pixel providing a pixel signal;
    an analog-to-digital conversion (ADC) circuit that converts the pixel signal to differential input signals; and
    a pair of data lines communicating the differential input signals;
    a sense amplifier that senses and amplifies a voltage difference between the differential input signals, wherein the sense amplifier comprises;
        a negative capacitance circuit connected between the pair of data lines;
        a current bias circuit that provides a bias current to the negative capacitance circuit;
        a voltage bias circuit that provide a bias voltage to the pair of data lines; and
        a comparator that receives differential output signals corresponding to the differential input signals as loaded by the negative capacitance circuit and generates a corresponding data output signal.

8. The image sensor of claim 7, further comprising:
a timing controller that provides a first control code setting a capacitance of the negative capacitance circuit and a second control code setting a level of the bias current.

9. The image sensor of claim 7, further comprising:
a replica sense amplifier connected between the pair of data lines to match an impedance of the sense amplifier as connected between the pair of data lines.

10. The image sensor of claim 9, wherein the replica sense amplifier comprises:
a negative capacitance circuit having substantially the same configuration as the negative capacitance circuit in the sense amplifier;
a current bias circuit having substantially the same configuration as the current bias circuit in the sense amplifier; and
a voltage bias circuit having substantially the same configuration as the voltage bias circuit in the sense amplifier.

11. The image sensor of claim 10, wherein the replica sense amplifier is connected between the pair of data lines at one end of the pair of data lines and the sense amplifier is connected between the pair of data lines at another end of the pair of data lines opposite the replica sense amplifier.

12. The image sensor of claim 10, further comprising:
a timing controller that provides a first control code setting a capacitance of the negative capacitance circuit and a second control code setting a level of the bias current.

13. An image processing apparatus comprising:
a lens;
an image sensor configured to convert an optical signal received via the lens into corresponding electrical image data; and
a processor that controls operation of the image sensor, wherein the image sensor comprises:
a pixel that provides a pixel signal;
an analog-to-digital (ADC) conversion circuit that converts the pixel signal into differential input signals; and
a sense amplifier that senses and amplifies a voltage difference between the differential input signals as communicated to the sense amplifier by a pair of data lines, wherein the sense amplifier comprises;
a negative capacitance circuit connected between the pair of data lines;
a current bias circuit that provides a bias current to the negative capacitance circuit;
a voltage bias circuit that provides a bias voltage to the pair of data lines; and
a comparator that receives differential output signals corresponding to the differential input signals as loaded by the negative capacitance circuit and generates a corresponding data output signal.

14. The image processing apparatus of claim 13, wherein the sense amplifier further comprises; a timing controller that provides a first control code setting a capacitance of the negative capacitance circuit and a second control code setting a level of the bias current.

15. The image processing apparatus of claim 14, wherein the sense amplifier further comprises; a replica sense amplifier connected between the pair of data lines to match an impedance of the sense amplifier as connected between the pair of data lines.

16. The image processing apparatus of claim 15, wherein the replica sense amplifier is connected between the pair of data lines at one end of the pair of data lines and the sense amplifier is connected between the pair of data lines at another end of the pair of data lines opposite the replica sense amplifier.

17. The image processing apparatus of claim 13, wherein the image processing apparatus is a digital single-lens reflex (DSLR) camera.

18. A method of operating a sense amplifier, the method comprising:
receiving differential input signals via a pair of data lines in a negative capacitance circuit;
amplifying a voltage difference between differential output signals corresponding to the differential input signals as loaded by the negative capacitance circuit using a differential-to-single-ended amplifier to generate a corresponding data output signal;
providing a bias voltage to the pair of data lines using a voltage bias circuit;
providing a bias current to the negative capacitance circuit using a current bias circuit;
defining a capacitance of the negative capacitance circuit in accordance a first control code provided to the sense amplifier; and
defining a level of the bias current is accordance with a second control code provided to the sense amplifier.

19. The method of claim 18, wherein the differential input signals are defined during a predetermined time period by a single data bit stored in a single bit Static Random Access Memory (SRAM).

* * * * *